United States Patent
Gyde et al.

(10) Patent No.: US 7,392,486 B1
(45) Date of Patent: Jun. 24, 2008

(54) METHOD AND APPARATUS FOR AUTOMATIC DISPLAY AND REMOVAL OF REQUIRED SYNOPTIC PAGES IN A CHECKLIST CONTEXT

(75) Inventors: Mike G. Gyde, Cave Creek, AZ (US); Mark I. Snyder, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 397 days.

(21) Appl. No.: 09/680,583

(22) Filed: Oct. 6, 2000

Related U.S. Application Data (60) Provisional application No. 60/233,825, filed on Sep. 19, 2000.

(51) Int. Cl.
*G06F 3/00* (2006.01)
(52) U.S. Cl. .............. 715/780; 715/705; 715/808; 715/708; 715/715; 715/709; 715/711; 701/9; 701/3; 701/14; 701/29
(58) Field of Classification Search ............ 345/700, 345/804, 805, 845, 854, 790; 340/945, 947; 701/3, 4, 8, 9, 10–16, 29, 30, 711; 715/500, 715/530, 517, 764, 705, 808, 708, 715, 709, 715/711
See application file for complete search history.

(56) References Cited

U.S. PATENT DOCUMENTS

| | | | | |
|---|---|---|---|---|
| 4,970,683 A | * | 11/1990 | Harshaw et al. | 715/841 |
| 5,265,024 A | * | 11/1993 | Crabill et al. | 701/200 |
| 5,454,074 A | * | 9/1995 | Hartel et al. | 345/710 |
| 5,475,594 A | * | 12/1995 | Oder et al. | 701/14 |
| 5,522,026 A | | 5/1996 | Records et al. | |
| 5,561,757 A | * | 10/1996 | Southgate | 345/790 |
| 5,931,874 A | | 8/1999 | Ebert et al. | |
| 6,038,498 A | | 3/2000 | Briffe | |
| 6,104,969 A | | 8/2000 | Beeks | |
| 6,112,141 A | * | 8/2000 | Briffe et al. | 701/14 |
| 6,262,720 B1 | * | 7/2001 | Jeffrey et al. | 345/710 |
| 6,529,137 B1 | * | 3/2003 | Roe | 340/691.1 |
| 6,633,861 B2 | * | 10/2003 | Hart et al. | 706/47 |
| 6,691,006 B2 | * | 2/2004 | Sinex | 701/29 |
| 7,000,187 B2 | * | 2/2006 | Messinger et al. | 715/705 |

FOREIGN PATENT DOCUMENTS

| | | |
|---|---|---|
| EP | 0 763 714 A2 | 3/1997 |
| EP | 0974885 A | 1/2000 |

OTHER PUBLICATIONS

Netscape Communicator 4.75, copyright 1994-2000, Netscape Communications Corporation.*

* cited by examiner

*Primary Examiner*—Weilun Lo
*Assistant Examiner*—Mylinh Tran
(74) *Attorney, Agent, or Firm*—Ingrassia, Fisher & Lorenz, P.C.

(57) ABSTRACT

The completion of an electronic checklist is facilitated by the automated display of certain data while completing the checklist. The disclosed program presents an automated display of synoptic, navigational, or flight management data for each task in a checklist. For each task in a checklist, there may be certain data which would aid the pilot or other user to complete the checklist. Such data can be displayed contemporaneously with the checklist. After the completion of each task in the checklist, the contents of the display can be restored to the state the display was in before the checklist was started.

13 Claims, 11 Drawing Sheets

METHOD AND APPARATUS FOR AUTOMATIC DISPLAY AND REMOVAL OF REQUIRED SYNOPTIC PAGES IN A CHECKLIST CONTEXT

REFERENCE TO RELATED APPLICATION

This application claims priority from and the benefit of U.S. Provisional Patent Application Ser. No. 60/233,825, filed September 19, 2000, the entire contents of which are hereby incorporated by reference.

BACKGROUND OF THE INVENTION

1. Technical Field

The present invention relates to aircraft cockpit displays and, more particularly, to graphical methods for displaying synoptic and flight data in conjunction with a checklist.

2. Background Information

Flying an aircraft can be a complicated task, requiring the monitoring and control of many different functions of an aircraft to determine if they are operating properly to increase the safety of a flight. Many of these functions can be checked regularly by the user to determine if the aircraft is in a proper operating mode. In addition, in the event of a failure of a system or component of an aircraft, there may be several systems or functions that should be checked or monitored to increase the safety of a flight.

A list (commonly called a checklist) is usually prepared by the manufacturer of the aircraft (or various other entities that are familiar with the operation of the particular aircraft) that contains the tasks that need to be performed or systems that need to be checked during certain phases of a flight. For example, before a flight, a pilot should check the aircraft power, battery, hydraulics, brakes, engines, fuel level, and various other equipment to determine that they are in proper working order. Checklists are also available for emergency situations. For example, in the event of a failure of one of the engines or of a pump supplying fuel to the engines, a checklist of tasks to be performed in the particular situation is typically available to the pilot of the aircraft or other crew member or user (including the co-pilot and various technicians who prepare the aircraft for flight).

These checklists may be provided on paper such that a user would read the checklist to determine which task must be performed next, complete the task, then proceed to the next task. A user may also mark the paper checklist to show that the checklist has been performed. For example, the pre-flight checklist may include a task of checking the fuel level, and once the user determines that the fuel level is adequate, the pilot marks the task as completed and performs the next task.

More recently, checklists have been provided on a computer display such that once a task has been completed, the user would mark the task completed on the display, possibly using a keyboard, a touch screen display, a track ball, or other pointing device or marking device known in the art. More recent systems have linked the computerized checklists various sensors on the aircraft, wherein the sensors automatically determine if the task is completed. For example, if one of the items on a checklist is to ensure that the doors of the pressurized cabin of the aircraft are closed, sensors on the doors determine if the doors are closed. If a door is not closed, the checklist will not allow the checklist to proceed until all the doors are closed. If all of the doors are closed when the task is selected, the checklist may automatically proceed to the next task on the checklist.

When performing the tasks on the checklist, it may be desirable for the user to have access to certain data, commonly called synoptic information, which presents a graphical overview of a particular system. For example, if the checklist requires the user to check if portions of the fuel system are operating properly, it may be desirable for the user to have access to data concerning the fuel systems. It may also be desirable to have access to other data that may be available to the pilot and the co-pilot. For example, one may have a desire to view navigation information in performing a checklist. In certain aircraft systems, access to navigation data may involve the monitoring of certain gauges. In other aircraft systems, the synoptic data and navigational information may be present in various display units present throughout the cockpit.

The presentation of data on aircraft flight displays continues to advance in sophistication, achieving increasingly higher levels of information density and, consequently, presenting a greater amount of visual information to be perceived and understood by the operator. In many applications, it is important that visual displays provide a proper cognitive mapping between what the operator is trying to achieve and the information available to accomplish the task. As a result, such systems increasingly utilize human-factor design principles in order to build instrumentation and controls that work cooperatively with human operators. Accordingly, the Federal Aviation Administration (FAA) has promulgated a number of standards and advisory circulars relating to flight instrumentation. More particularly, Title 14 of the U.S. Code of Federal Regulations, Federal Aviation Regulations (FAR) Part 25, Sec. 25.1321 et seq. provides guidelines for arrangement and visibility of instruments, warning lights, indicators, and the like. Similarly, detailed guidelines related to electronic displays can be found in FAA Advisory Circular 20-88A, *Guidelines on the Marking of Aircraft Powerplant Instruments* (September 1985).

In summary, in certain situations, including, but not limited to, emergency situations, it is desirable for the appropriate synoptic data to be displayed for each task in a checklist. It may also be desirable for such a display to occur automatically, to ease the workload of the pilot or other user. It may also be desirable for the displays to revert to the configuration present before the checklist was started, to further ease the workload of the pilot or other user. It may also be desirable for such an automated checklist system to be overridden such that the user has complete control over the displays of the aircraft. It may also be desirable to incorporate such a linkage between the checklist and the synoptic display in the context of a checklist with automatic sensing.

SUMMARY

The present invention is directed to a computerized system that satisfies these needs. A computer program featuring an embodiment of this invention receives instructions to start the checklist process. Then the program stores the layout of the frames on the display from which the checklist function is selected and the available checklists are displayed. After a checklist with at least one task is selected, a window containing various information related to the selected checklist is opened. This window may contain a synoptic frame including several synoptic pages within the synoptic frame. For each task of the selected checklist, an appropriate synoptic page is displayed. This window may also contain FMS data or navigational data. After the checklist is complete, the stored frame layout is restored.

BRIEF DESCRIPTION OF THE DRAWINGS

The invention is further described in connection with the accompanying drawings, in which.

DETAILED DESCRIPTION OF THE INVENTION

The novel features of the present invention will become apparent to those skilled in the art upon examination of the detailed description of the invention which follows, or can be learned by practice of the present invention. It should be understood, however, that the detailed description of the invention and the specific examples presented herein, while indicating certain embodiments of the present invention, are provided for illustration purposes only, because various changes and modifications that are within the scope of the invention will become apparent to those of skilled in the art from the detailed description of the invention and claims that follow. The present invention may be described herein in terms of functional block components and various processing steps. It should be appreciated that such functional blocks may be realized by any number of hardware, firmware, and/or software components configured to perform the specified functions. For example, the present invention may employ various integrated circuit components, e.g., memory elements, digital signal processing elements, look-up tables, and the like, which may carry out a variety of functions under the control of one or more microprocessors or other control devices. Such general techniques and components that are known to those skilled in the art are not described in detail herein.

Figure 1:
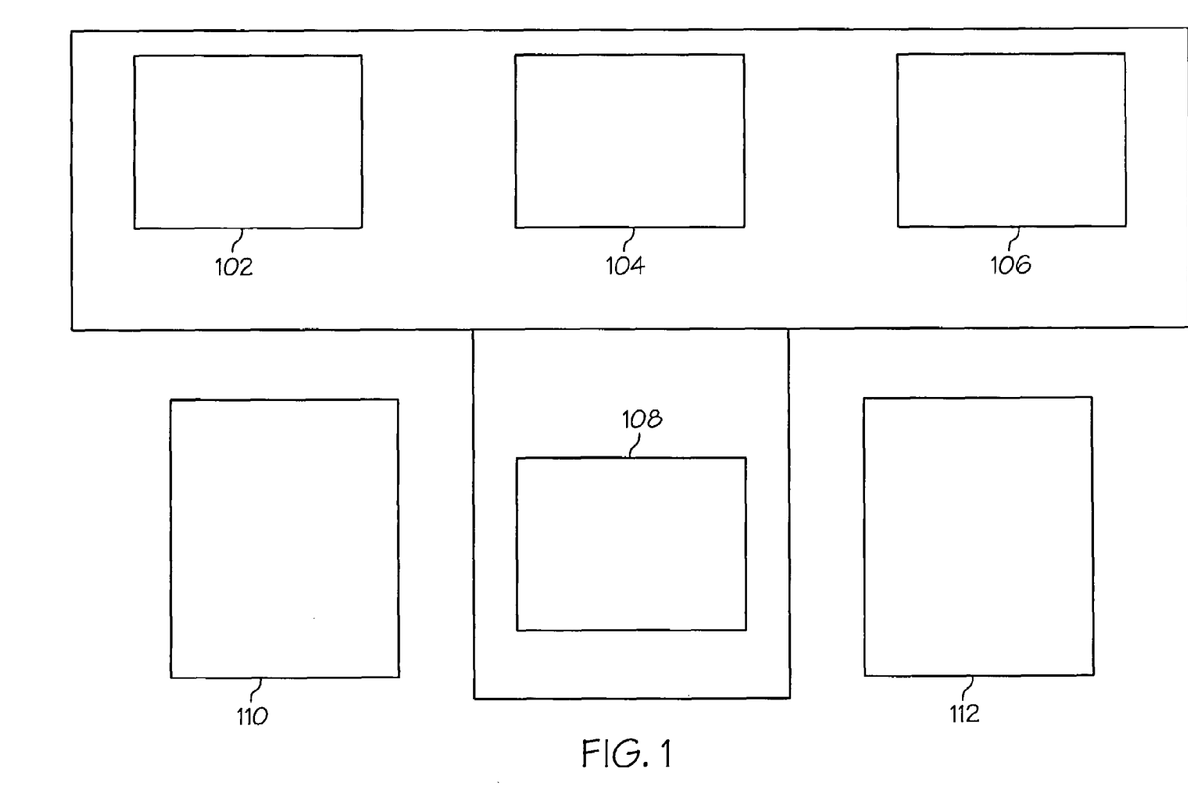
FIG. 1 shows a schematic representation of an exemplary cockpit display layout of the present invention.

FIG. 1 is a schematic representation of an exemplary cockpit layout showing display 102, display 104, display 106, and display 108 in accordance with an embodiment of the present invention. In an exemplary embodiment, the pilot of the aircraft would be seated at position 110, while the co-pilot is seated at position 112. In an alternative embodiment, the cockpit may include a control mechanism through which the pilot or co-pilot controls the aircraft. There may also be a keyboard and/or a pointing device through which the pilot and co-pilot controls the displays. Such devices are not shown in FIG. 1, but it should be understood that those devices may be present and may be located in numerous locations in the cockpit. Each of the displays is a cathode ray tube (CRT), a liquid crystal display (LCD), or any other device that is able to display various data in response to input provided by a computer unit (not shown). Moreover, each display may be controlled by a separate computer or, in the alternative, a single computer may control multiple displays. These displays may also be replaced by functionally equivalent devices which display images which currently exist or may be developed in the future.

A pilot is present at the left side of the exemplary cockpit, in front of display 102 and next to display 108, while a co-pilot is present at the right side of the cockpit, in front of display 106 and next to display 108. It should be noted that displays 102, 104, 106, and 108 need not be co-planar, may be different sizes, and may be angled in any suitable direction. Indeed, in a typical cockpit, displays 102, 104, and 106 are substantially co-planar, with display 108 located on a separate console in between the pilot and the co-pilot. It should also be noted that displays 102, 104, 106, and 108 are not shown to scale, as each display may have a different aspect ratio than that shown.

Figure 2:
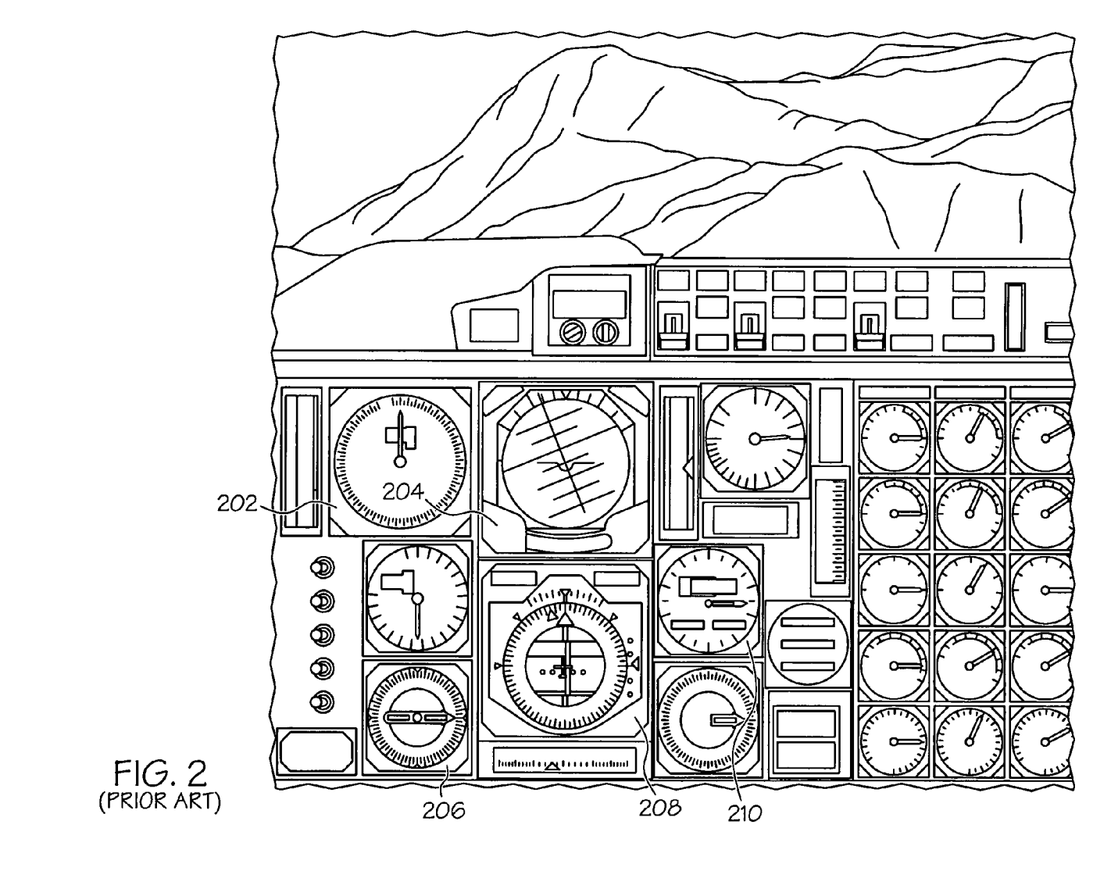
FIG. 2 shows a graphical representation of the gauges in an exemplary prior art cockpit.

Displays 102, 104, 106, and 108 provide the functionality that was formerly provided by a plurality of gauges. In the past, a cockpit would contain separate gauges to indicate, inter alia, attitude, altitude, airspeed and vertical speed, as shown in FIG. 2, which is a graphical representation of an exemplary prior art cockpit. Illustrated in FIG. 2 are, inter alia, airspeed indicator 202, attitude indicator 204, radio compass 206, horizontal situation indicator 208, and altimeter 210.

Figure 3:
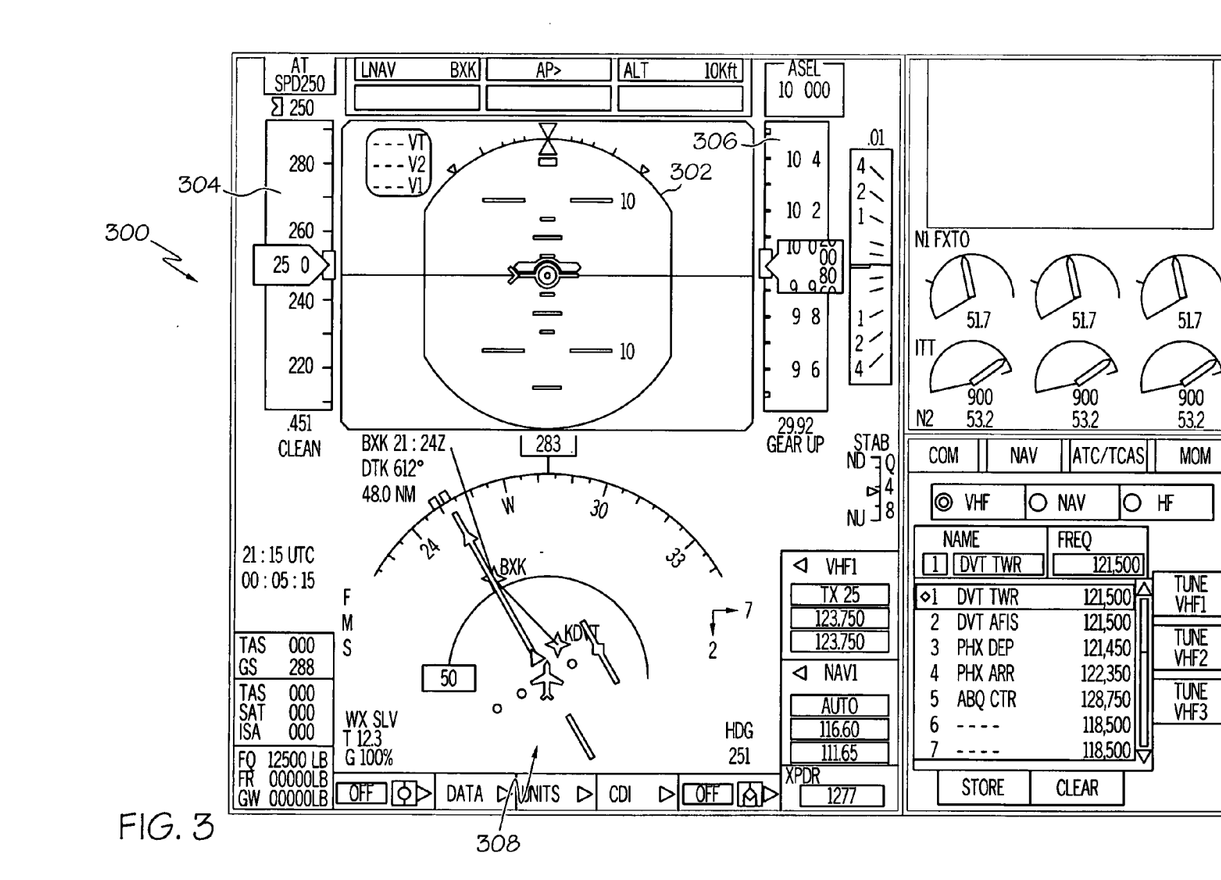
FIG. 3 is an exemplary cockpit display showing the contents of the display that is typically in front of the pilot and co-pilot.

The present invention replaces some or all of the individual gauges illustrated in FIG. 2 by various display units. For example, FIG. 3 illustrates an exemplary display 300, which is a single CRT or LCD display unit including graphical representations of an attitude indicator, airspeed indicator, altimeter, and horizontal situation indicator which have been rendered in separate areas of display 300 by a computer. Specifically, area 302 contains a rendering of an attitude indicator, area 304 displays the airspeed, altimeter 306 displays the altitude, and heading source indicator (HSI) 308 shows the heading of the aircraft. For further discussion of display 300, see the related patent application entitled, "System and Method for Flight Mode Annunciators," filed on Oct. 6, 2000 as Ser. No. 09/679,924.

Figure 8:
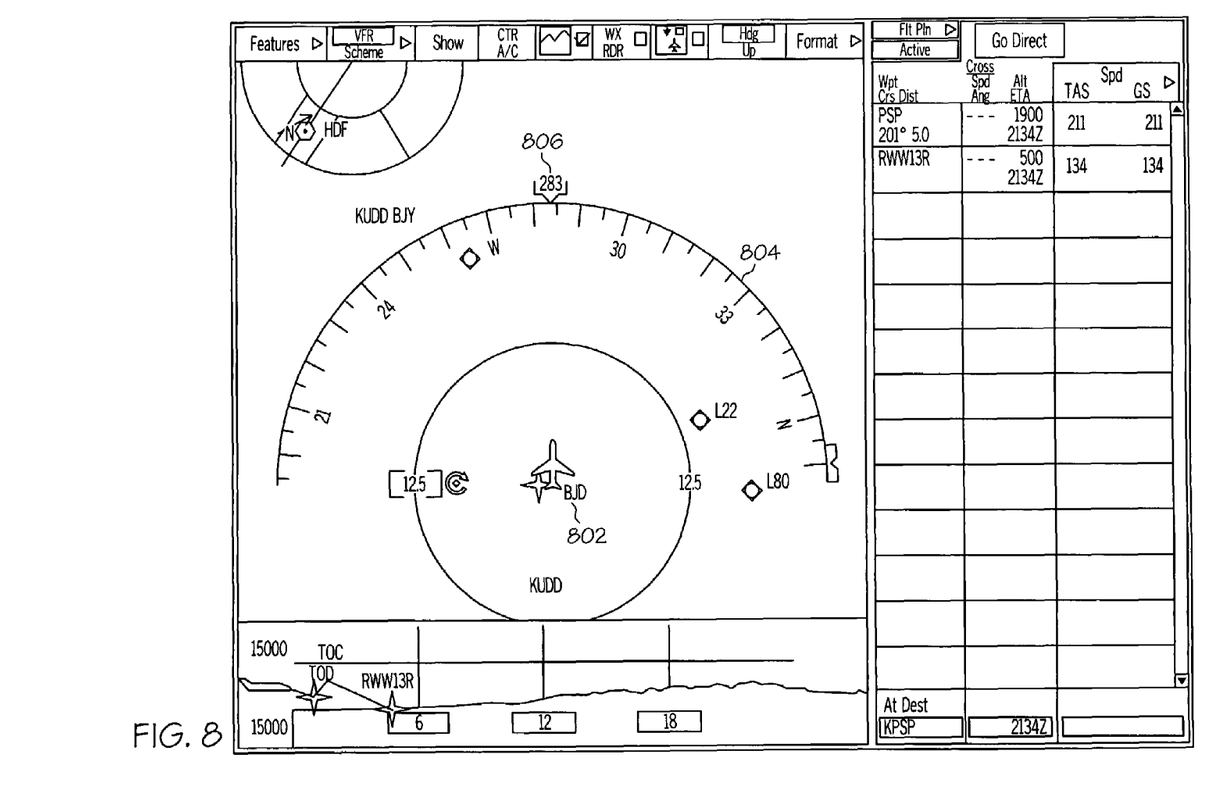
FIG. 8 shows an exemplary cockpit display illustrating a navigational window.

Referring back to FIG. 1, display 102 and display 106 will usually show identical information, such that the pilot and the co-pilot have access to the same information. Moreover, displays 102 and 106 are configured in a manner similar to that shown in FIG. 3, such that the attitude, altitude, airspeed, and heading are displayed. Display 104 may be configured, for example, to display navigational information, such as an indication of the current heading of the aircraft and data regarding the surrounding area, as shown in FIG. 8. Particularly, FIG. 8 shows an exemplary layout of a navigational window, wherein the current position of the aircraft is shown as icon 802. The layout of the surrounding area, including hills and valleys is also shown to give a pilot additional information. Additionally, arc 804 is a reference protractor showing the aircraft's heading, which is numerically shown at icon 806.

Display 108 is configured such that various synoptic data is present, such as the status of various systems, including the electrical systems (e.g., breakers, switches, generators, and charging systems); the cabin pressure and temperature; anti-ice systems; the flight controls (e.g., flaps, landing gear, slats, elevators, ailerons, spoilers, and trims); hydraulics; fuel system (e.g., valves, pumps, crossflows); and full engine data and engine control system data. Each of the displays is configured such that a menu can be accessed from a keyboard or a pointing device, wherein the menu includes the synoptic data options. From this menu, one can select a checklist function and the particular checklist.

When the checklist function and a particular checklist is selected, the tasks of the checklist are listed on the display. In an exemplary embodiment of the present invention, once a step of a checklist is encountered in which access to a particular synoptic page is desirable, the particular synoptic page is displayed within a synoptic frame. Because the synoptic frame typically occupies the lower half of the display unit, the display that was previously active in the display is restricted to the top half of the display.

Figure 4:
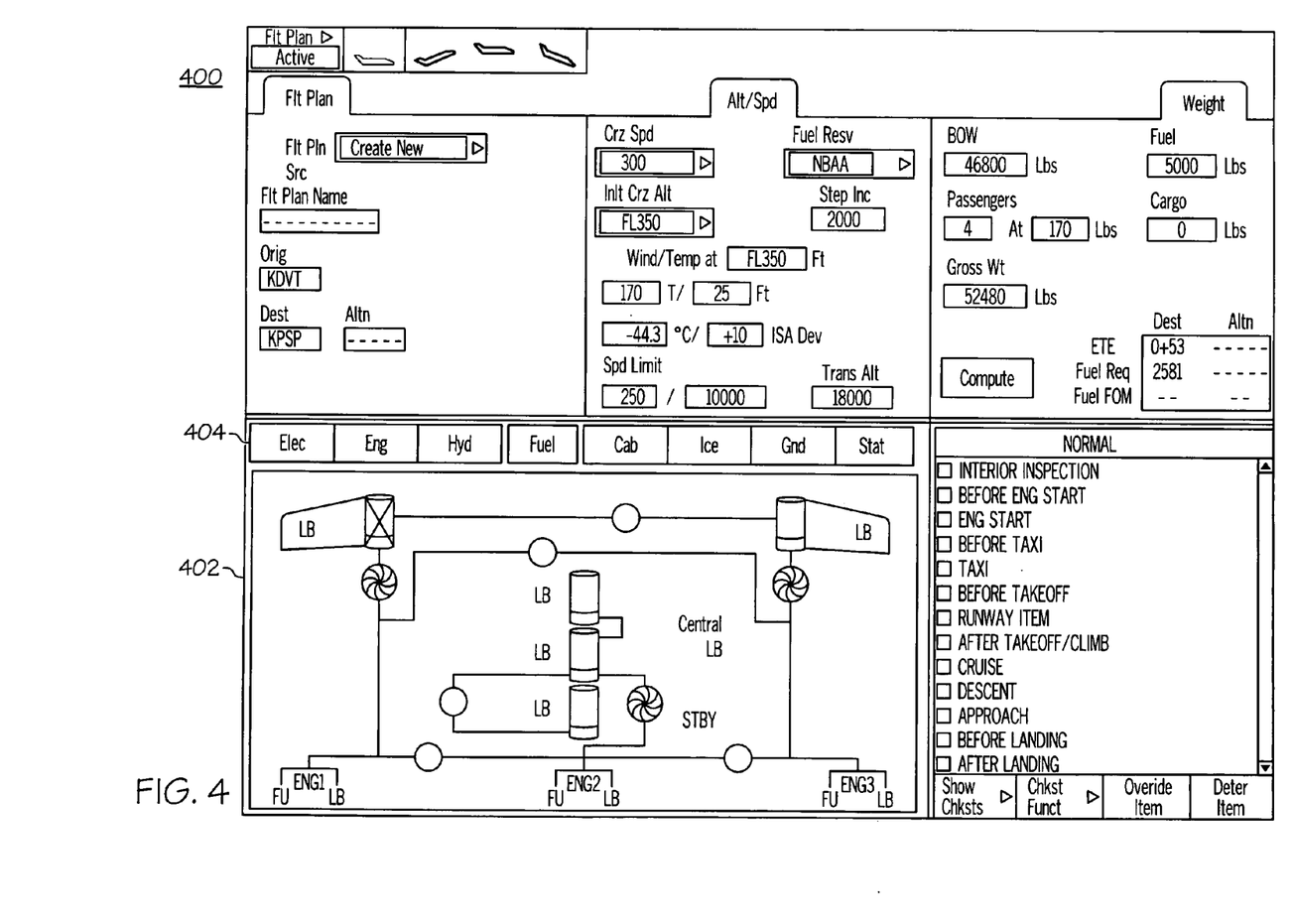
FIG. 4 shows an exemplary display after a checklist function is selected.

FIG. 4 shows an exemplary resulting display after the checklist function is selected and the synoptic display is shown. Display 400 is equivalent to any one of displays 102, 104, 106, or 108 of FIG. 1. The top half of display 400 shows an exemplary flight plan screen. (In a previous step, not shown, the entirety of display 400 contained the exemplary flight plan screen.) After a checklist function is selected, the bottom half of display 400 shows a synoptic page 402 within a synoptic frame and a list of available checklists. Tabs 404 allow selection from the available synoptic pages. Upon the completion of the checklist (or during any other predetermined interval), the display preferably reverts to the display that was previously being shown. In this example, the display would revert to showing a full-screen flight plan.

Figure 11:
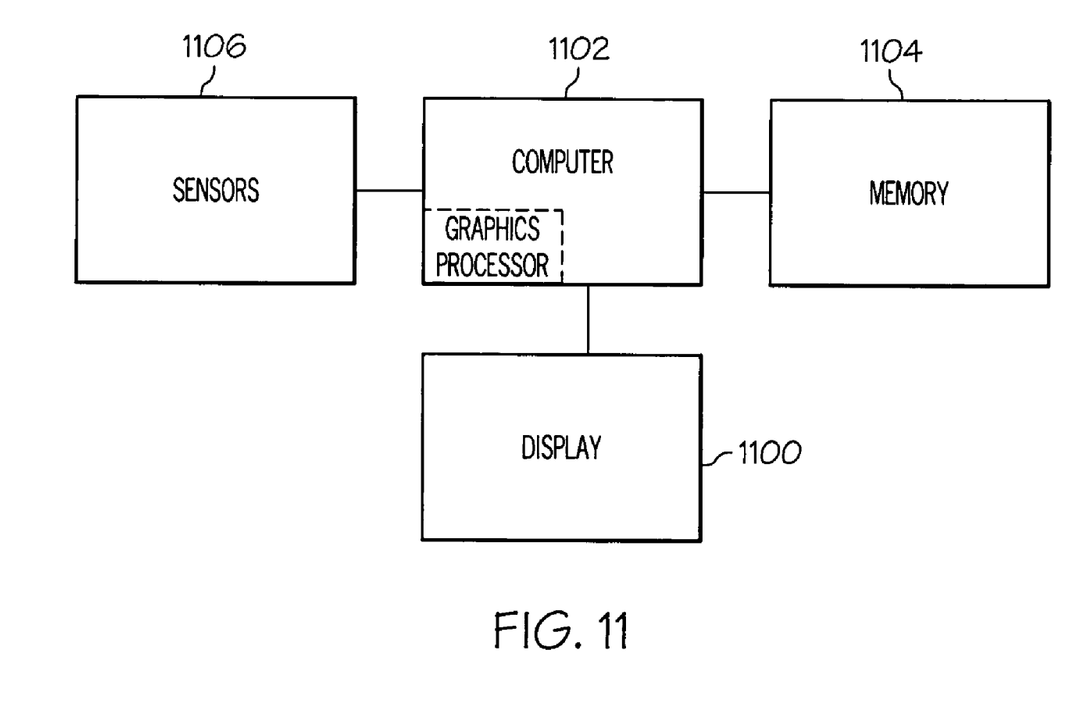
FIG. 11 shows a block diagram of the environment in which an embodiment of the present invention is executed.

FIG. 11 shows an exemplary block diagram of the system in which an embodiment of the present invention operates. Display 1100 is controlled by computer 1102. As discussed above, there may be more than one display in an aircraft. Each display may be controlled by a separate computer or, in the alternative, a single computer may control more than one display. It may be preferable for each display to have a separate computer such that a failure of one computer only results in the loss of one display. Computer 1102 includes a graphics processor that sends the signals to display 1100 for rendering. Computer 1102 is coupled to memory 1104, which may include various types of memory such as Random Access Memory (RAM) and Read-Only Memory (ROM), as well as storage units such as a hard disk drive or other storage units that are known in the art. Computer 1102 also receives inputs from sensors 1106. Sensors 1106 are located throughout the aircraft and sense flight data such as air speed, altitude, and attitude. Sensors 1106 may also sense aircraft data, such as the status of the landing gear and the doors, as well as various other data. Computer 1102 processes the data from sensors 1106 and sends instructions to display 1100 for rendering the display. For example, computer 1102 processes the attitude information from sensors 1106 and generates an attitude display (such as attitude indicator 302 of FIG. 3) that is rendered on display 1100. Memory 1104 stores the various programs that are executed by computer 1102. An embodiment of the present invention may be stored in memory 1104 for execution by computer 1102.

Figure 5:
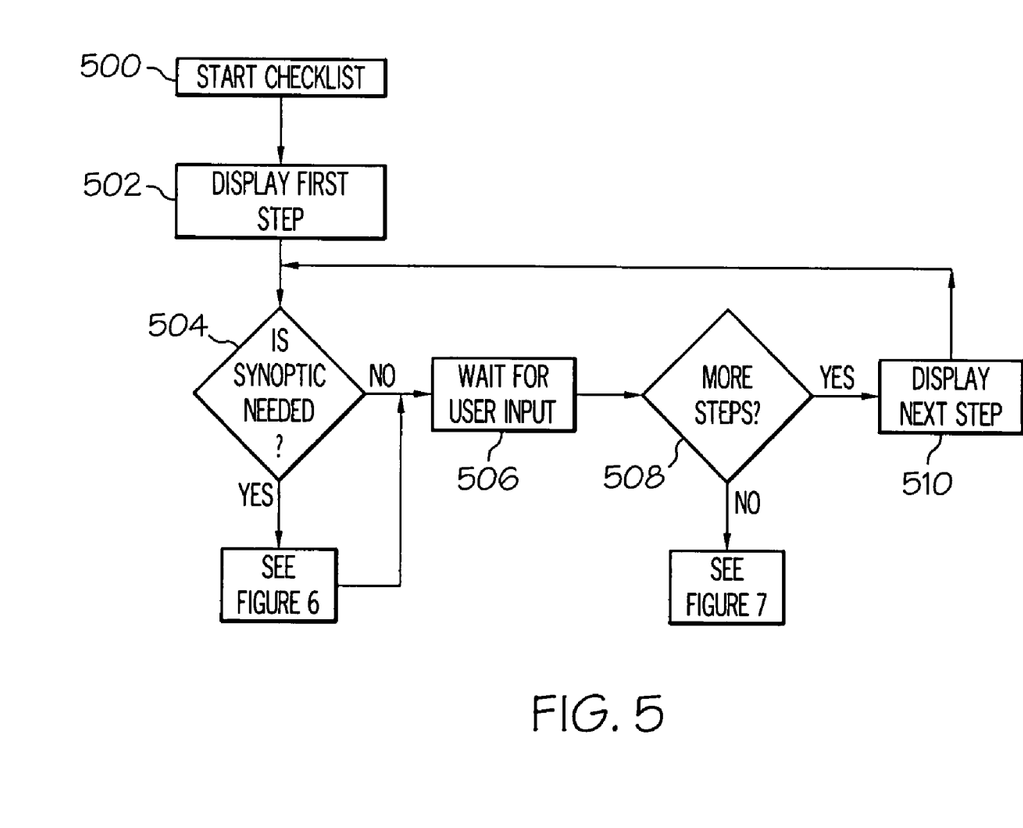
FIG. 5 is a flowchart of a computer program containing an embodiment of the present invention.

A flowchart of the operation of a computer program containing an embodiment of the present invention is shown in FIG. 5. At step 500, a particular checklist is started in a number of different manners, such as the use of a pointing device, a touchscreen display, or a keyboard. The checklist is retrieved from memory and the first task of the checklist is rendered on the display (step 502). In the alternative, all of the tasks are rendered on the display, with the first task being highlighted or otherwise indicated as being the current task. It is then determined, at step 504, whether or not it would be desirable to display a synoptic page. The computer program retrieved from memory typically contains the logic, possibly contained in a look-up table, which determines if it would be desirable to display a synoptic for each particular task in a checklist. The desirability of a synoptic page may be precoded into the program. If the functionality of the checklist would not be improved by the display of a synoptic, the checklist waits for user input, as shown at step 506. A user may indicate the step has been completed by a variety of methods, including placing the cursor at a predetermined area of the display and clicking using a pointing device or a keyboard command. The computer program then determines if there are more steps to be performed in the checklist at step 508. This step may be performed in a variety of manners, known in the art. For example, each checklist may contain a number of tasks. Following the last task in a particular checklist, there may be a flag or other indicator to show that there are no further tasks. At step 508, the computer program may determine if the flag is present to determine if the end of the checklist has been reached. If there are more steps to be performed, then the next step in the checklist is displayed or highlighted at step 510.

Figure 6:
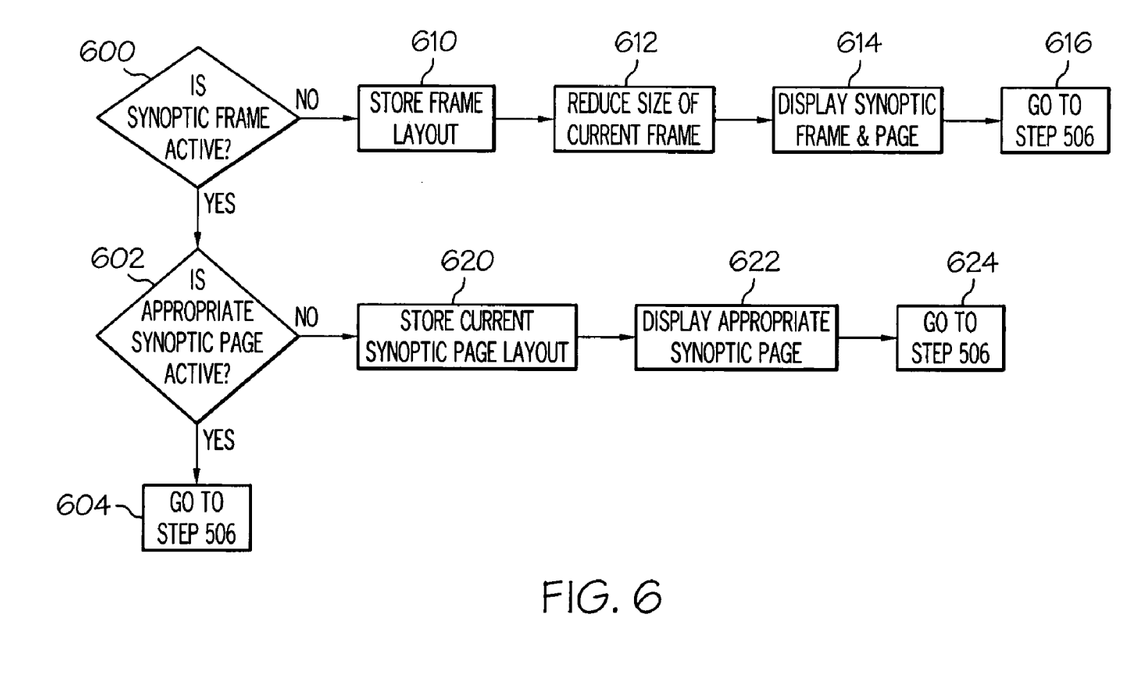
FIG. 6 is a continuation of the flowchart of FIG. 5.

If the program determines, at step 504, that a synoptic page should be displayed, operation continues as shown in FIG. 6. At step 600, the program containing this embodiment determines if the synoptic frame is active on the display with the checklist. As computer 1102 (see FIG. 11) controls the display, the status of the display is readily accessible to the program containing this embodiment. If a synoptic frame is active, the frame is checked to determine if the appropriate synoptic page, as predetermined in the computer program, is active at step 602. As explained above, the synoptic frame may contain several pages of synoptic data. For example, there may be a page displaying hydraulic synoptic data and a separate page displaying electrical synoptic data. Each task in the checklist may have an appropriate synoptic page associated with it. For example, if a specific task in the checklist requires the user to determine the status of a hydraulic system, the hydraulics synoptic page associated is preferably displayed. If the appropriate synoptic page is being displayed, the operation of this embodiment continues to step 506 of FIG. 5.

At step 600, if the computer determines that the synoptic frame is not active, the current layout of the display is stored in a specific location of memory at step 610. For example, if the navigational window is currently active in a full-screen mode, that information is stored in memory. The specific location in memory may be identified in a number of different manners, as is known in the art. Then, the size of the window in the current layout is reduced such that, for example, less than half of the display is occupied (step 612). The synoptic frame is then opened and the appropriate synoptic page is displayed within the frame at step 614. The operation continues at step 506 of FIG. 5.

If the computer program determined, at step 602, that the synoptic frame is active, but the appropriate synoptic page is not being displayed within the synoptic frame, operation proceeds with step 620, where the layout of the synoptic page is stored at a specific location in memory. This step is optional, as one may not desire to store the synoptic page layout. Thereafter, the appropriate synoptic page is displayed at step 622 and operation continues at step 506 of FIG. 5.

Figure 7:
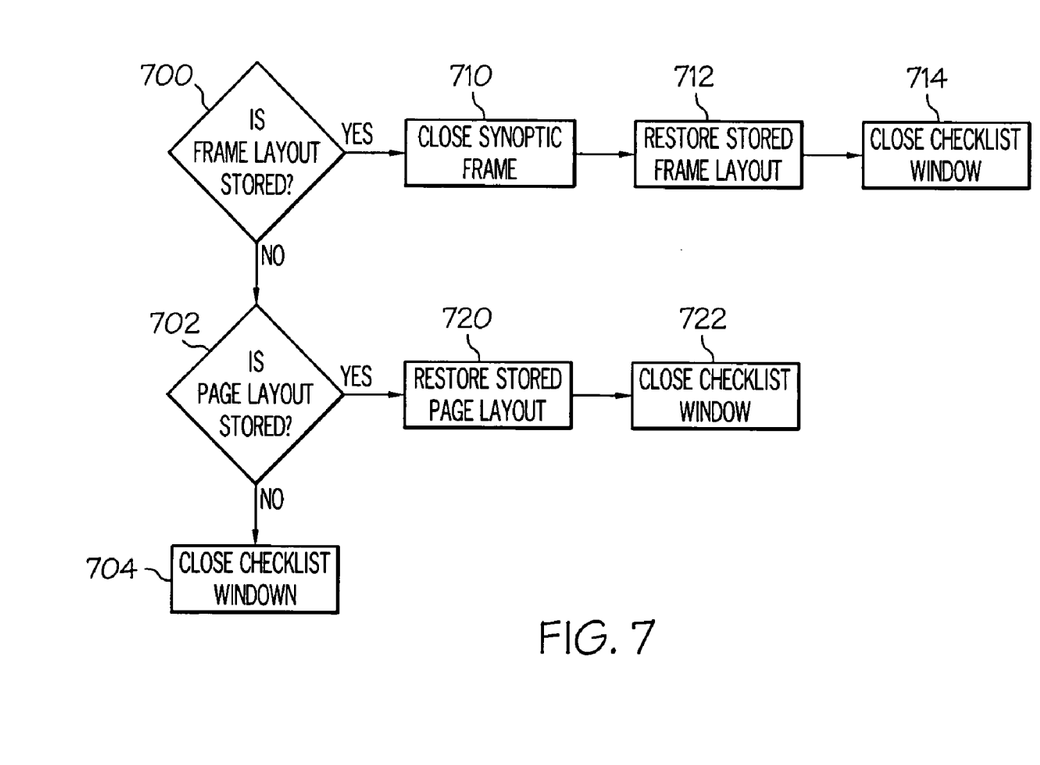
FIG. 7 is a continuation of the flowchart of FIGS. 5 and 6.

FIG. 7 depicts the operation of the computer program containing this embodiment when the end of the checklist is encountered. First, the memory is checked at the specific location to determine if a frame layout is stored (step 700). A frame layout would have been stored at step 612 of FIG. 6, while the active frames were stored in memory at the time the checklist was started. If such a frame layout is in memory, the stored frame layout is restored in step 712. In other words, the display that was present at the time the checklist started is restored; so there is no need for the user to change the display to his preferred settings, because the previous settings are automatically restored.

If a frame layout is not stored in memory, the memory is then checked at step 702 to determine if there is a page layout stored in memory. Such a page layout would have been stored at step 620 of FIG. 6 when the synoptic frame is active when the checklist is started. If step 620 was omitted as described above, step 702 would also be omitted.

Figure 9:
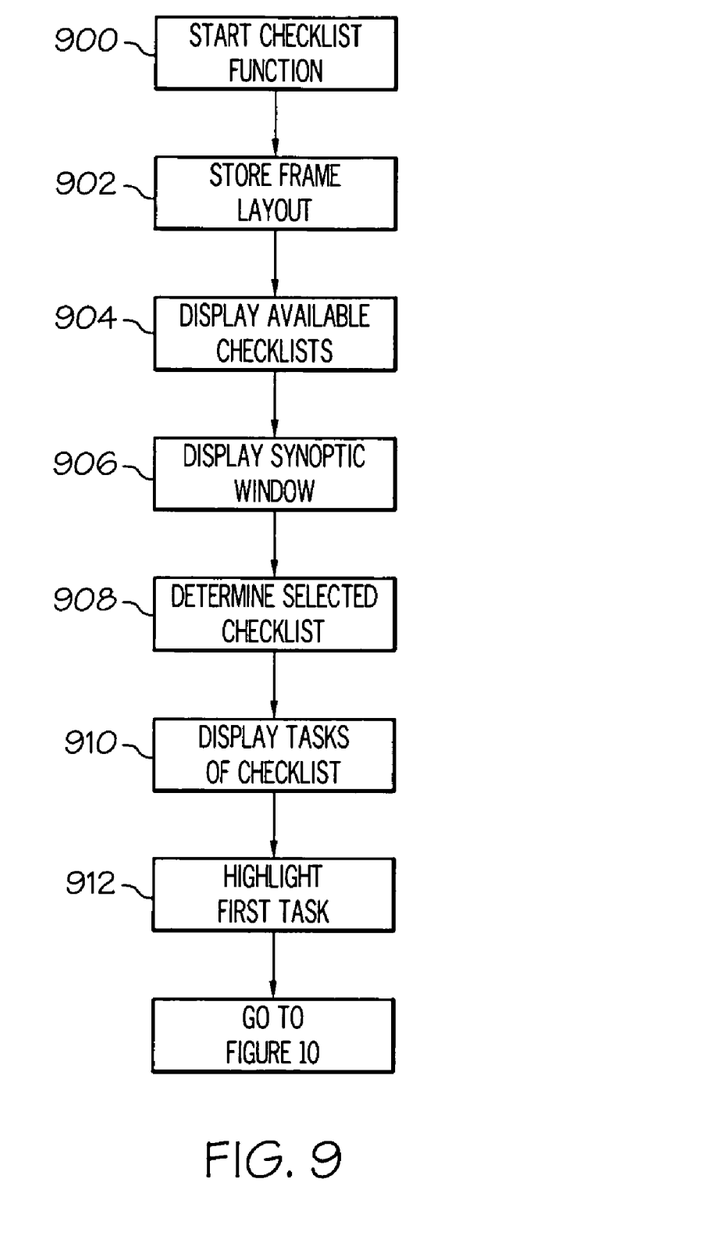
FIG. 9 shows a flowchart of a computer program containing an alternative embodiment of the present invention.

A flowchart of the operation of a computer program containing an alternative embodiment of the present invention is shown in FIG. 9. At step 900, the checklist function is started in a number of different manners known in the art, such as the use of a pointing device, a touchscreen display, or a keyboard. At step 902, the frame layout is stored into a predetermined location in memory for later retrieval. Among the information stored is the current active frame or frames in the display and their layout. The available checklists are retrieved from memory and rendered on the display at step 904. All checklists for an aircraft may be rendered on the display. In the alternative, a list of checklists which are appropriate for the current status of the aircraft may be displayed. The current status of the aircraft may be determined by monitoring of the various sensors throughout the aircraft. For example, if the landing gears are down and there is weight on the landing gears, the computer may determine that the aircraft is on the ground. In that situation, checklists which are particular to the aircraft when it is in the air would not be displayed.

Before a user is able to select a checklist, the synoptic window is rendered on the display at step 906. Then, this embodiment awaits the user's selection of a checklist to perform at step 908. The computer renders the tasks of the selected checklist at step 910 and the first task in the checklist is highlighted at step 912. Operation of this embodiment then continues in FIG. 10 following step 1000.

Figure 10:
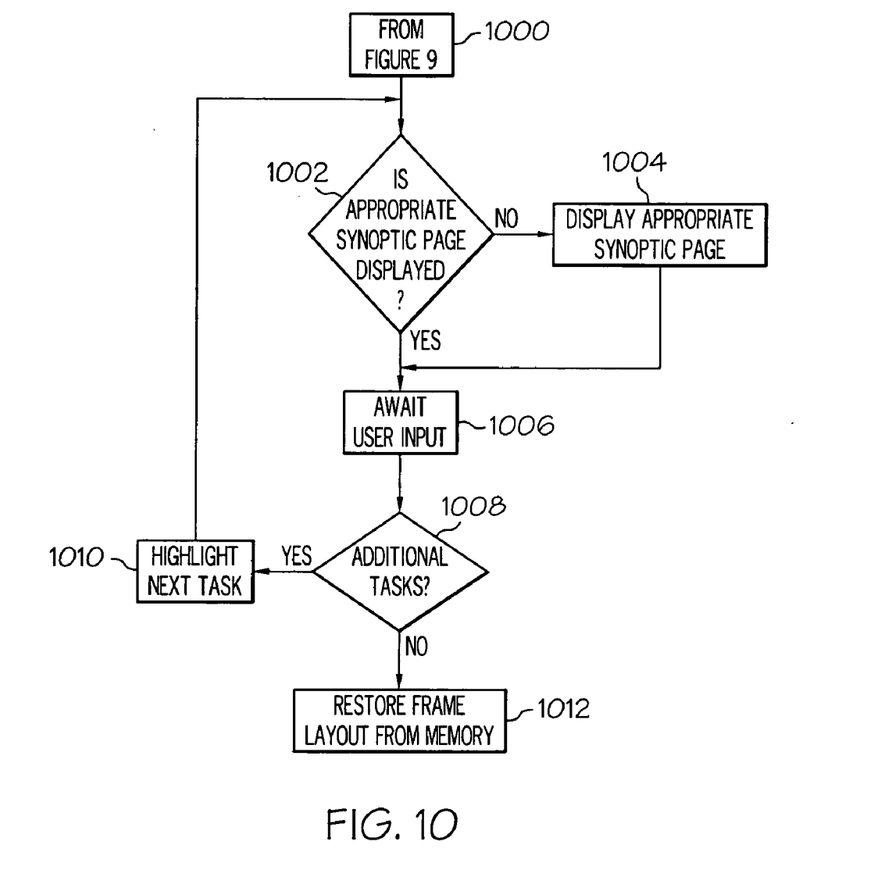
FIG. 10 is a continuation of the flowchart of FIG. 9.

At step 1002, it is determined whether the appropriate synoptic page is being displayed. Such a step may be accomplished by determining which synoptic page is being rendered on the display by the computer. Then, through the use of a look-up table or other similar method, the computer will compare what is being displayed with what would be appropriate to display. As shown on FIG. 4, there are a number of different synoptic displays available for display. Synoptic page 402 is shown as a Fuel synoptic page. If, for example, a particular task on the checklist required the user to inquire as to the status of a particular fuel system component, the fuel synoptic page would be the appropriate page. If the appropriate synoptic page is not currently active, the appropriate synoptic page is displayed at step 1004. If the appropriate synoptic page is active, or if there is no appropriate synoptic display, the computer program of this embodiment awaits user input at step 1006. After the user performs the task called for in the checklist, the user may, for example, click on the task to indicate its successful completion. After the user has indicated such a completion, the computer program of this embodiment determines if additional tasks remain on the checklist at step 1008, which may be accomplished in a number of different manners, as described above and as is known in the art. If more tasks remain, the next task is highlighted at step 1010, and operation continues at step 1002.

If there are no remaining tasks, as determined in step 1008, the frame layout that was stored at step 902 is read and the display is restored to the stored configuration, with all displays updated. It should be noted that, when a window is reduced in size to show the synoptic frame, the window of reduced size is still continually updated. This embodiment may completely restore the frame layout that was present before the checklist was started. In the alternative, the frame layout may be restored with the exception that the available checklists would be displayed. If the frame layout stored in step 902 included a synoptic frame, the synoptic frame will remain on the display. However, it may not be necessary to store the particular synoptic page within the synoptic frame which was displayed at the selection of the checklist function. If the particular page is not stored, while the synoptic frame remains displayed as it was before the checklist was started, the particular synoptic page being displayed may or may not be the page displayed before the checklist was started.

While the above description focused on the display of synoptic data, it should be understood that any available information may be displayed with the checklist. For example, if a task on a particular checklist requires the user to check the approach settings of the aircraft, it may be desirable to display the approach settings from a Flight Management Settings (FMS) window in order to complete the task, and restore the settings with the same logic disclosed above.

The above described checklist program is particularly useful in the event that one or more displays in the cockpit becomes faulty or otherwise defective. As shown in FIG. 1, there may be four displays in a cockpit. Displays 102 and 106 may contain attitude, altitude, airspeed, and heading information. Display 104 may be configured to have a navigational display active, while display 108 may be configured to display engine information or various synoptic pages. Thus, the four displays of FIG. 1 may be sufficient to show all desired information. However, in the event of a failure of one of displays 102 or 106, display 104 or display 108 may need to be used to show the attitude, altitude, airspeed, and heading information, as it may be useful for both a pilot and a co-pilot to have access to such information. In that situation, there would only be one remaining display with which to show what was previously shown on two displays. Because the synoptic page may be important to the completion of a checklist, the automatic activation of the synoptic page is desirable. In the event of the failure of two displays, such a feature would become even more desirable as the display space available for various information is drastically reduced.

Additionally, in the event of a failure of a system of the aircraft, a checklist corresponding to the system that failed may automatically be displayed, along with a synoptic page, if appropriate. For example, if a fuel pump failed during flight, a fuel checklist can be displayed, along with the appropriate synoptic display. The user would then be able to better alleviate the problems created by the failure of the system.

The checklists may also be coupled to various systems in the aircraft. For example, if a fuel checklist requires the user to switch a fuel booster to standby, the checklist will not proceed unless the fuel booster is actually switched. After the fuel booster is switched, the sensors of the aircraft determine such a change and the checklist may automatically proceed to the next task.

The checklist described above may also have a mode in which the user can turn off the linking feature such that the synoptic, navigational, flight management, or other display is not automatically activated.

The above description presents exemplary modes contemplated in carrying out the invention. The techniques described above are, however, susceptible to modifications and alternate constructions from the embodiments shown above are possible. Other variations and modifications of the present invention will be apparent to those of ordinary skill in the art, and it is the intent of the appended claims that such variations and modifications be covered. For example, while this invention has been described with respect to particular screen layouts, other screen layouts are also possible in this invention.

Consequently, it is not the intention to limit the invention to the particular embodiments disclosed. On the contrary, the invention is intended to cover all modifications and alternate constructions falling within the scope of the invention, as expressed in the following claims when read in light of the description and drawings. No element described in this specification is necessary for the practice of the invention unless expressly described herein as "essential" or "required."

We claim:

1. A method for displaying a checklist on a display of an aircraft, the method comprising the steps of:
   displaying a first layout comprising the checklist, the checklist displayed on a first section of the display and including a plurality of tasks, at least one task capable of receiving user input;
   determining whether to display aircraft data related to a first task of the plurality of tasks;
   storing the first layout in a memory, if a determination is made to display the aircraft data related to the first task;
   displaying a second layout without user input comprising the checklist and the aircraft data related to the first task, if a determination is made to display the aircraft data related to the first task, the checklist displayed on the first section of the display and the aircraft data related to the first task displayed on a second section of the display;
   determining whether to display aircraft data related to a second task of the plurality of tasks;
   retrieving the stored first layout from the memory, if a determination is made not to display the aircraft data related to the second task; and
   displaying the stored first layout, if a determination is made not to display the aircraft data related to the second task, after displaying the second layout and without receiving a user input.

2. The method of claim 1, wherein the aircraft data related to the first task comprises synoptic data.

3. The method of claim 1, wherein the checklist comprises a second task and the step of displaying comprises indicating the first task as being a current task.

4. The method of claim 3, further comprising indicating the second task as being the current task.

5. The method of claim 4, further comprising:
   determining whether to display aircraft data related to the second task; and
   displaying a third layout comprising the checklist and the aircraft data related to the second task, if a determination is made to display the aircraft data related to the second task, the checklist displayed on the first section of the display and the aircraft data related to the second task displayed on a second section of the display.

6. The method of claim 5, further comprising:
   displaying the first layout, after displaying the third layout and receiving a user input.

7. The method of claim 1, further comprising:
   indicating an end of the checklist on the display.

8. A method for displaying a main checklist on a display of an aircraft, the method comprising the steps of:
   displaying a first layout comprising the main checklist, the main checklist displayed on a first section of the display and including a plurality of available checklists capable of receiving user input;
   displaying a second layout comprising an available checklist, upon receipt of a first user input, the available checklist displayed on a first section of the display and including a plurality of tasks capable of receiving user input;
   determining whether to display aircraft data related to a first task of the plurality of tasks;
   storing the second layout in a memory, if a determination is made to display the aircraft data related to the first task;
   displaying a third layout without user input comprising the available checklist and the aircraft data, if a determination is made to display the aircraft data related to the first task, the available checklist displayed on the first section of the display and the aircraft data related to the first task displayed on a second section of the display;
   determining whether to display aircraft data related to a second task of the plurality of tasks;
   retrieving the stored first layout from the memory, if a determination is made not to display the aircraft data related to the second task; and
   displaying one of the first and the second layouts, if a determination is made not to display the aircraft data related to the second task, after displaying the third layout and without receiving a second user input.

9. The method of claim 8, wherein the aircraft data related to the first task comprises synoptic data.

10. The method of claim 8, wherein the available checklist comprises a second task and the step of displaying comprises indicating the first task as being a current task.

11. The method of claim 10, further comprising indicating the second task as being the current task.

12. The method of claim 11, further comprising:
    determining whether to display aircraft data related to the second task; and
    displaying a fourth layout comprising the available checklist and the aircraft data related to the second task, if a determination is made to display the aircraft data related to the second task, the available checklist displayed on the first section of the display and the aircraft data related to the second task displayed on a second section of the display.

13. The method of claim 12, further comprising:
    displaying the first layout, after displaying the fourth layout and receiving a third user input.

* * * * *